US012645040B2

(12) United States Patent
Kumagai et al.

(10) Patent No.: US 12,645,040 B2
(45) Date of Patent: Jun. 2, 2026

(54) OPTICAL CONNECTION STRUCTURE

(71) Applicant: SUMITOMO ELECTRIC INDUSTRIES, LTD., Osaka (JP)

(72) Inventors: Tsutaru Kumagai, Osaka (JP); Tetsuya Nakanishi, Osaka (JP); Hajime Arao, Osaka (JP); Yuuichi Mitose, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 278 days.

(21) Appl. No.: 18/030,523

(22) PCT Filed: Dec. 20, 2021

(86) PCT No.: PCT/JP2021/047080
§ 371 (c)(1),
(2) Date: Apr. 6, 2023

(87) PCT Pub. No.: WO2022/138587
PCT Pub. Date: Jun. 30, 2022

(65) Prior Publication Data
US 2023/0375792 A1 Nov. 23, 2023

(30) Foreign Application Priority Data

Dec. 22, 2020 (JP) ................................ 2020-212291

(51) Int. Cl.
*G02B 6/42* (2006.01)
*G02B 6/44* (2006.01)
(52) U.S. Cl.
CPC ......... *G02B 6/4243* (2013.01); *G02B 6/4214* (2013.01); *G02B 6/4239* (2013.01);
(Continued)

(58) Field of Classification Search
CPC .. G02B 6/4243; G02B 6/4214; G02B 6/4239; G02B 6/4249; G02B 6/4266; G02B 6/4403; G02B 6/3885; G02B 6/30
See application file for complete search history.

(56) References Cited

U.S. PATENT DOCUMENTS 5,818,559 A 10/1998 Yoshida
2003/0021560 A1* 1/2003 Ohashi ................. G02B 6/4403
385/114
(Continued)

FOREIGN PATENT DOCUMENTS

JP H09-090333 A 4/1997
JP 09152522 A * 6/1997
(Continued)

OTHER PUBLICATIONS

Material Properties of Polysulfone (Year: 2019).*
Material Properties of Polyetherimide (Year: 2019).*

*Primary Examiner* — Thomas A Hollweg
(74) *Attorney, Agent, or Firm* — OLIFF PLC

(57) ABSTRACT

The optical connection structure includes: optical fibers disposed such that end faces are arranged in a first direction; an optical functional component having a first surface facing the end faces of the optical fibers; a holding member having a second surface facing the first surface and directly or indirectly fixed to the first surface, a third surface facing away from the second surface, and a fiber holding holes extending from the third surface toward the second surface and respectively accommodating the optical fibers; and a distortion suppression member having a fourth surface facing the third surface and directly or indirectly fixed to the third surface and sandwiching the holding member with the optical functional component. Thermal expansion coefficients of the optical functional component and the distortion
(Continued)

suppression member are higher or lower than a thermal expansion coefficient of the holding member.

13 Claims, 16 Drawing Sheets

(52) U.S. Cl.
CPC ......... *G02B 6/4249* (2013.01); *G02B 6/4266* (2013.01); *G02B 6/4403* (2013.01)

(56)                    References Cited

U.S. PATENT DOCUMENTS

| | | | |
|---|---|---|---|
| 2003/0152326 A1 | 8/2003 | Morimoto et al. | |
| 2004/0184729 A1 | 9/2004 | Martin et al. | |
| 2017/0097482 A1* | 4/2017 | Furuya | G02B 6/423 |
| 2019/0258007 A1* | 8/2019 | Kainuma | G02B 6/3644 |
| 2020/0264386 A1* | 8/2020 | Hodge | G02B 6/3853 |

FOREIGN PATENT DOCUMENTS

| | | | | | |
|---|---|---|---|---|---|
| JP | H09-152522 A | | 6/1997 | | |
| JP | 2003232963 A | * | 8/2003 | | G02B 6/266 |
| JP | 2004102108 A | * | 4/2004 | | |
| JP | 2017-072653 A | | 4/2017 | | |
| JP | 2019-144434 A | | 8/2019 | | |
| JP | 2019-533836 A | | 11/2019 | | |
| WO | 2018/089286 A1 | | 5/2018 | | |

* cited by examiner

*Fig.14*

| | YOUNG'S MODULUS MPa | THERMAL EXPANSION COEFFICIENT ppm/°C | POISSON'S RATIO |
|---|---|---|---|
| ROTATOR | 200,000 | 10.4 | 0.29 |
| LENS ARRAY | 131,000 | 4.2 | 0.266 |
| HOLDING MEMBER | 65,500 | 3.3 | 0.2 |
| DISTORTION SUPPRESSION MEMBER (LCP) | 20,500 | 10 | 0.4 |
| ADHESIVE | 3,380 | 55 | 0.4 |

OPTICAL CONNECTION STRUCTURE

TECHNICAL FIELD

The present disclosure relates to an optical connection structure. This application is based upon and claims the benefit of priority from Japanese Application No. 2020-212291 filed on Dec. 22, 2020, the entire contents of which are incorporated herein by reference.

BACKGROUND ART

Patent Literature 1 discloses a collimation array in which an optical fiber array and a lens array are spaced apart.

CITATION LIST

Patent Literature

[Patent Literature 1] Japanese Unexamined Patent Publication No. 2004-102108

SUMMARY OF INVENTION

The optical connection structure of the present disclosure includes a plurality of optical fibers, an optical functional component, a holding member, and a distortion suppression member. The plurality of optical fibers are disposed such that end faces of the plurality of optical fibers are arranged in at least a first direction and respectively extend along a second direction intersecting the first direction. The optical functional component has a first surface facing the end faces of the plurality of optical fibers and is optically coupled to the end faces of the plurality of optical fibers on the first surface. The holding member has a second surface facing the first surface and directly or indirectly fixed to the first surface, a third surface facing away from the second surface, and a plurality of fiber holding holes extending from the third surface toward the second surface and respectively accommodating the plurality of optical fibers. The distortion suppression member has a fourth surface facing the third surface and directly or indirectly fixed to the third surface. In the second direction, the holding member is sandwiched between the optical functional component and the distortion suppression member. The thermal expansion coefficients of the optical functional component and the distortion suppression member are higher than the thermal expansion coefficient of the holding member. Alternatively, the thermal expansion coefficients of the optical functional component and the distortion suppression member are lower than the thermal expansion coefficient of the holding member.

BRIEF DESCRIPTION OF DRAWINGS

FIG. 14 illustrates the Young's modulus, thermal expansion coefficient, and Poisson's ratio of each of the optical element (rotator), lens array, holding member, distortion suppression member, and adhesive of the model used in the simulation.

DESCRIPTION OF EMBODIMENTS

Figure 1:
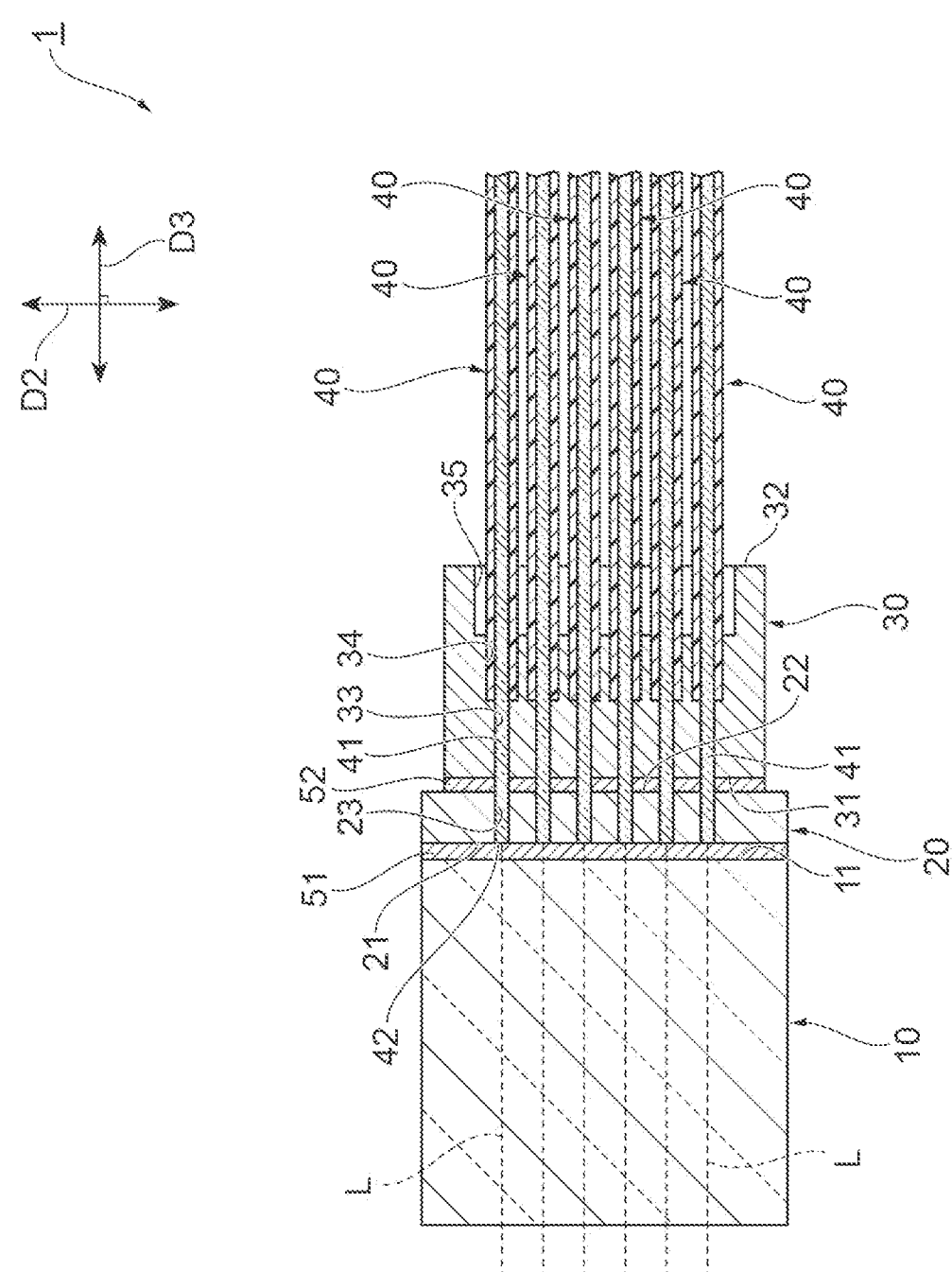
FIG. 1 is a cross-sectional view of an optical connection structure according to one embodiment of the present disclosure.

[Problem to be Solved by Present Disclosure]

In optically coupling the optical fiber array including the plurality of optical fibers and the optical functional component such as the lens array, it is conceivable that the holding member holding the end portion of the optical fiber in the optical fiber array and the optical functional component are fixed to each other by adhesion. The holding member has, for example, the plurality of holes respectively accommodating the plurality of optical fibers. However, the thermal expansion coefficient of the holding member may be significantly different from the thermal expansion coefficient of the optical functional component. In that case, a change in ambient temperature leads to bending distortion of the holding member and fluctuations in the directions of the optical axes of the plurality of optical fibers. As a result, the efficiency of optical coupling between the plurality of optical fibers and the optical functional component fixed to the plurality of optical fibers declines or the efficiency of optical coupling between the plurality of optical fibers and the optical functional component coupled via a space to the plurality of optical fibers declines.

Effect of Present Disclosure

According to the optical connection structure of the present disclosure, it is possible to reduce the degree of decline in the efficiency of optical coupling between an optical fiber and an optical functional component attributable to a change in temperature.

Description of Embodiment of Present Disclosure

First, an embodiment of the present disclosure will be listed and described. An optical connection structure according to one embodiment includes a plurality of optical fibers, an optical functional component, a holding member, and a distortion suppression member. The plurality of optical fibers are disposed such that end faces of the plurality of optical fibers are arranged in at least a first direction and respectively extend along a second direction intersecting the first direction. The optical functional component has a first surface facing the end faces of the plurality of optical fibers and is optically coupled to the end faces of the plurality of optical fibers on the first surface. The holding member has a second surface facing the first surface and directly or indirectly fixed to the first surface, a third surface facing away from the second surface, and a plurality of fiber holding holes extending from the third surface toward the second surface and respectively accommodating the plurality of optical fibers. The distortion suppression member has a fourth surface facing the third surface and directly or indirectly fixed to the third surface. In the second direction, the holding member is sandwiched between the optical functional component and the distortion suppression member. The thermal expansion coefficients of the optical functional component and the distortion suppression member are higher than the thermal expansion coefficient of the holding member. Alternatively, the thermal expansion coefficients of the optical functional component and the distortion suppression member are lower than the thermal expansion coefficient of the holding member.

In this optical connection structure, the optical functional component and the holding member are directly or indirectly fixed to each other. Therefore, in a case where the distortion suppression member is not provided, the difference in thermal expansion coefficient between the optical functional component and the holding member leads to bending distortion in the holding member and fluctuations in the directions of the optical axes of the plurality of optical fibers. On the other hand, in the case of the optical connection structure of one embodiment, a change in temperature leads to stress in the opposite direction attributable to the distortion suppression member, in addition to stress attributable to the optical functional component, in the holding member. Then, these stresses offset each other in the holding member. Therefore, according to the optical connection structure described above, it is possible to reduce fluctuations in the directions of the optical axes of the plurality of optical fibers attributable to a change in temperature and reduce the degree of decline in the efficiency of optical coupling between the optical fiber and the optical functional component.

In the optical connection structure described above, a thickness of the distortion suppression member in the second direction may be 1 mm or more. According to the present inventor's simulation, in a case where the thickness of the distortion suppression member is less than 1 mm, bending of the holding member is increasingly suppressed as the thickness of the distortion suppression member increases. On the other hand, in a case where the thickness of the distortion suppression member is 1 mm or more, the correlation between the thickness of the distortion suppression member and bending of the holding member is low. Therefore, the above effects can be sufficiently exhibited insofar as the distortion suppression member has a thickness of at least 1 mm.

In the optical connection structure described above, a ratio ($Eb/Ec$) of the Young's modulus $Eb$ of the distortion suppression member to the effective Young's modulus $Ec$ of the optical functional component may be 0.192 or more. According to the present inventor's simulation, the above effects can be sufficiently exhibited in a case where the ratio ($Eb/Ec$) satisfies this condition.

In the optical connection structure described above, the distortion suppression member may hold the plurality of optical fibers. In this case, the plurality of optical fibers can be held more firmly.

The optical connection structure described above may include an optical fiber ribbon formed by a resin coating collectively protecting the plurality of optical fibers. The distortion suppression member may have a plurality of fiber holding holes respectively accommodating the plurality of optical fibers and a ribbon holding hole accommodating the optical fiber ribbon. In this case, the plurality of optical fibers can be held more firmly via the optical fiber ribbon.

In the optical connection structure described above, the distortion suppression member may further have a fifth surface facing away from the fourth surface in the second direction. The ribbon holding hole may extend toward the fourth surface along the second direction from a bottom surface of a recessed portion formed in the fifth surface. The plurality of fiber holding holes may extend along the second direction from the ribbon holding hole and reach the fourth surface. In this case, the optical fiber ribbon and the plurality of optical fibers can be held with an easy-to-form simple structure.

In the optical connection structure described above, the optical functional component may include a lens array and the lens array may include the first surface. In this case, an optical fiber array including the plurality of optical fibers and the lens array are optically coupled, and it is possible to provide the optical connection structure in which a decline in the efficiency of optical coupling between the optical fiber array and the lens array attributable to a change in temperature is small.

In the optical connection structure described above, a main constituent material of the lens array may be silicon, a main constituent material of the holding member may be glass, and a main constituent material of the distortion suppression member may be resin. In this case, both the thermal expansion coefficient of the lens array and the thermal expansion coefficient of the distortion suppression member are higher than the thermal expansion coefficient of the holding member. Therefore, the above effects can be exhibited.

In the optical connection structure described above, the optical functional component may further include an optical element different from the lens array, and the lens array may be sandwiched between the holding member and the optical element in the second direction, and the optical element may be directly or indirectly fixed to the lens array. In this case, it is possible to provide the optical connection structure that performs various operations with respect to light that enters each optical fiber or light that is emitted from each optical fiber. In this case, the optical element may be at least one of a rotator, an optical filter, an optical isolator, or an optical path conversion component.

In the optical connection structure described above, the second surface may be bonded to the first surface with an adhesive. In this case, the second surface can be indirectly fixed to the first surface.

In the optical connection structure described above, the fourth surface may be bonded to the third surface with an adhesive. In this case, the fourth surface can be indirectly fixed to the third surface.

Details of Embodiment of Present Disclosure

Specific examples of the optical connection structure of the present disclosure will be described below with reference to the drawings. It should be noted that the present invention is not limited to the examples, is defined by the scope of claims, and is intended to include every modification within the scopes of claims and equivalents. In the following description, the same reference numerals are given to the same elements in the description of the drawings with redundant description omitted. In the following description, being light-transmissive refers to the property of transmitting 95% or more of light of a target wavelength at a thickness of 1 mm. In the embodiment described below, the target wavelength is, for example, 1260 nm or more and 1360 nm or less.

Figure 2:
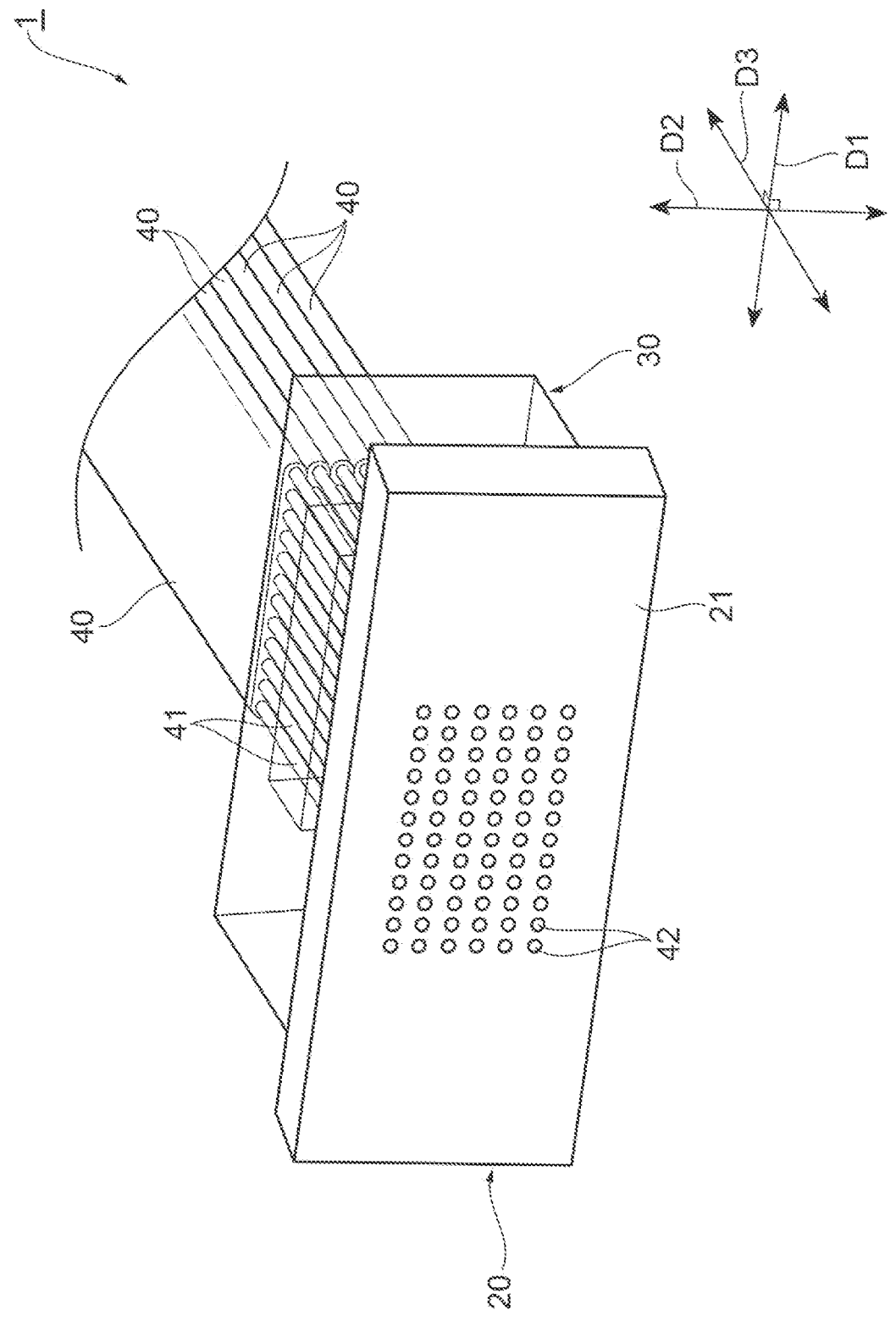
FIG. 2 is a perspective view of the optical connection structure.

FIG. 1 is a cross-sectional view of an optical connection structure 1 according to one embodiment of the present disclosure. FIG. 2 is a perspective view of the optical connection structure 1. As illustrated in FIGS. 1 and 2, the optical connection structure 1 includes an optical functional component 10 (not illustrated in FIG. 2), a holding member 20, a distortion suppression member 30, and N optical fiber ribbons (tape core wires) 40. N is an integer of 1 or more. As an example, N is 6 in the drawings. Each optical fiber ribbon 40 is formed by a resin coating collectively protecting M optical fibers 41 arranged in a direction D1 (first direction), which is the width direction of each optical fiber ribbon 40. M is an integer of 2 or more. End faces 42 of the M optical fibers 41 configuring each optical fiber ribbon 40 are mutually flush and arranged in the direction D1. The N optical fiber ribbons 40 are arranged in a direction D2 intersecting the direction D1. The direction D2 is, for example, orthogonal to the direction D1. The end faces 42 of the optical fibers 41 configuring each optical fiber ribbon 40 are flush with the end faces 42 of the optical fibers 41 configuring the other optical fiber ribbons 40, and these end faces 42 are arranged in the direction D2. Each optical fiber 41 is, for example, a single-mode optical fiber. Each optical fiber 41 extends along a direction D3 (second direction) intersecting both the direction D1 and the direction D2. In other words, the central axis of each optical fiber 41 is along the direction D3. The direction D3 is, for example, orthogonal to both the direction D1 and the direction D2. A certain length of region in the tip portion of each optical fiber 41 is exposed from the resin coating of the optical fiber ribbon 40.

The optical functional component 10 is a light-transmissive and block-shaped optical passive component. The optical functional component 10 has a surface 11 (first surface) extending along the direction D1 and the direction D2 and intersecting the direction D3. The surface 11 faces each end face 42 of the optical fibers 41 of the N optical fiber ribbons 40. In one example, the surface 11 is flat. The normal direction of the surface 11 may coincide with the direction D3 or may be slightly inclined with respect to the direction D3. The optical functional component 10 is optically coupled to each end face 42 of the optical fibers 41 of the N optical fiber ribbons 40 on the surface 11.

The holding member 20 holds at least a part, including the end face 42, of the part of the optical fiber 41 exposed from the resin coating of the optical fiber ribbon 40. The holding member 20 is a member that has a flat plate shape or a rectangular parallelepiped shape. The holding member 20 has a surface 21 (second surface) extending along the direction D1 and the direction D2 and intersecting the direction D3 and a surface 22 (third surface) facing away from the surface 21, extending along the direction D1 and the direction D2, and intersecting the direction D3. In one example, the surfaces 21 and 22 are flat. In one example, the surfaces 21 and 22 are parallel to each other. The thickness of the holding member 20 in the direction D3, that is, the distance between the surfaces 21 and 22 is, for example, in the range of 0.5 mm to 3.0 mm. The normal direction of the surface 21 may coincide with the direction D3 or may be slightly inclined with respect to the direction D3.

The surface 21 faces the surface 11 of the optical functional component 10 and is directly or indirectly fixed to the surface 11. In one example, the surface 21 is bonded to the surface 11 with an adhesive 51. In other words, the adhesive 51 is interposed between the surface 21 and the surface 11. The adhesive 51 is light-transmissive. The adhesive 51 is, for example, a resin adhesive. An adhesive that has a refractive index difference of zero or close to zero with respect to the constituent materials of the optical functional component 10 and the optical fiber 41 is selected as the adhesive 51. Examples of the adhesive 51 include epoxy resin-based, acrylic resin-based, and silicone resin-based adhesives. The thickness of the adhesive 51 in the direction D3 is, for example, in the range of 0.01 mm to 0.1 mm.

The holding member 20 has a plurality of, that is, M×N fiber holding holes 23. Each fiber holding hole 23 extends from the surface 22 toward the surface 21. In one example, each fiber holding hole 23 penetrates between the surface 22 and the surface 21. The M×N fiber holding holes 23 are in one-to-one correspondence with the M×N optical fibers 41. Each fiber holding hole 23 accommodates and holds at least a part of the part of the corresponding optical fiber 41 exposed from the resin coating.

The holding member 20 is made of a material lower in thermal expansion coefficient than the optical functional component 10 or a material higher in thermal expansion coefficient than the optical functional component 10. The holding member 20 may or may not be light-transmissive. The main constituent material of the holding member 20 is glass. In one example, glass is the only constituent material of the holding member 20. The glass is, for example, Pyrex glass (Pyrex is a registered trademark). It should be noted that the thermal expansion coefficient of Pyrex glass is in the range of $3 \times 10^{-6} \mathrm{K}^{-1}$ to $4 \times 10^{-6} \mathrm{K}^{-1}$ and the Young's modulus of Pyrex glass is 65500 MPa. The shape of the holding member 20 can be formed by a method such as cutting and etching.

The distortion suppression member 30, which has a substantially rectangular parallelepiped shape, is a member for offsetting bending stress applied to the holding member 20. The distortion suppression member 30 of the present embodiment further has the function of holding the N optical fiber ribbons 40 and the N×M optical fibers 41. The holding member 20 is sandwiched between the optical functional component 10 and the distortion suppression member 30 in the direction D3. The distortion suppression member 30 has a surface 31 extending along the direction D1 and the direction D2 and intersecting the direction D3 and a surface 32 facing away from the surface 31 in the direction D3. In one example, the surface 31 is flat. The thickness of the distortion suppression member 30 in the direction D3, that is, the distance between the surface 31 and the surface 32 is, for example, in the range of 1 mm to 5 mm. The surface 31 faces the surface 22 of the holding member 20 and is directly or indirectly fixed to the surface 22. In one example, the surface 31 is bonded to the surface 22 with an adhesive 52. In other words, the adhesive 52 is interposed between the surface 31 and the surface 22. The adhesive 52 may or may not be light-transmissive. The adhesive 52 is, for example, made of resin. In one example, the adhesive 52 is epoxy resin-based, acrylic resin-based, or silicone resin-based. The thickness of the adhesive 52 in the direction D3 is, for example, in the range of 0.01 mm to 0.1 mm.

The distortion suppression member 30 has N×M fiber holding holes 33 respectively accommodating the N×M optical fibers 41 and N ribbon holding holes 34 respectively accommodating the N optical fiber ribbons 40. Each ribbon holding hole 34 extends toward the surface 31 along the direction D3 from the bottom surface of a recessed portion 35 formed in the surface 32. Each fiber holding hole 33 extends along the direction D3 from the corresponding ribbon holding hole 34 and reaches the surface 31.

In a case where the thermal expansion coefficient of the optical functional component 10 is higher than the thermal expansion coefficient of the holding member 20, the thermal expansion coefficient of the distortion suppression member 30 is also higher than the thermal expansion coefficient of the holding member 20. In a case where the thermal expansion coefficient of the optical functional component 10 is lower than the thermal expansion coefficient of the holding member 20, the thermal expansion coefficient of the distortion suppression member 30 is also lower than the thermal expansion coefficient of the holding member 20. The thermal expansion coefficient of the distortion suppression member 30 may be higher or lower than the thermal expansion coefficient of the optical functional component 10. The Young's modulus of the distortion suppression member 30 is lower than the Young's modulus of each of the optical functional component 10 and the holding member 20.

The distortion suppression member 30 may or may not be light-transmissive. The distortion suppression member 30 of the present embodiment is mainly made of resin. In one example, the distortion suppression member 30 of the present embodiment is made of resin. Examples of the resin configuring the distortion suppression member 30 include liquid crystal polymer (LCP) and polyphenylene sulfide (PPS). The thermal expansion coefficient of the LCP is in the range of $10 \times 10^{-6} \mathrm{K}^{-1}$ to $20 \times 10^{-6} \mathrm{K}^{-1}$, and the Young's modulus of the LCP is 20500 MPa. The distortion suppression member 30 can be formed by, for example, performing molding using a mold having a plurality of pins for forming the fiber holding hole 33 and the ribbon holding hole 34.

In the optical connection structure 1 illustrated in FIGS. 1 and 2, light L emitted from the end face 42 of each optical fiber 41 enters the optical functional component 10. A predetermined action is imparted to the light L in the optical functional component 10. After that, the light L is emitted from the surface of the optical functional component 10 on the side opposite to the surface 11. Alternatively, a predetermined action is imparted in the optical functional component 10 with respect to the light L incident on the surface of the optical functional component 10 on the side opposite to the surface 11. After that, the light L is incident on the end face 42 of each optical fiber 41.

Figure 3:
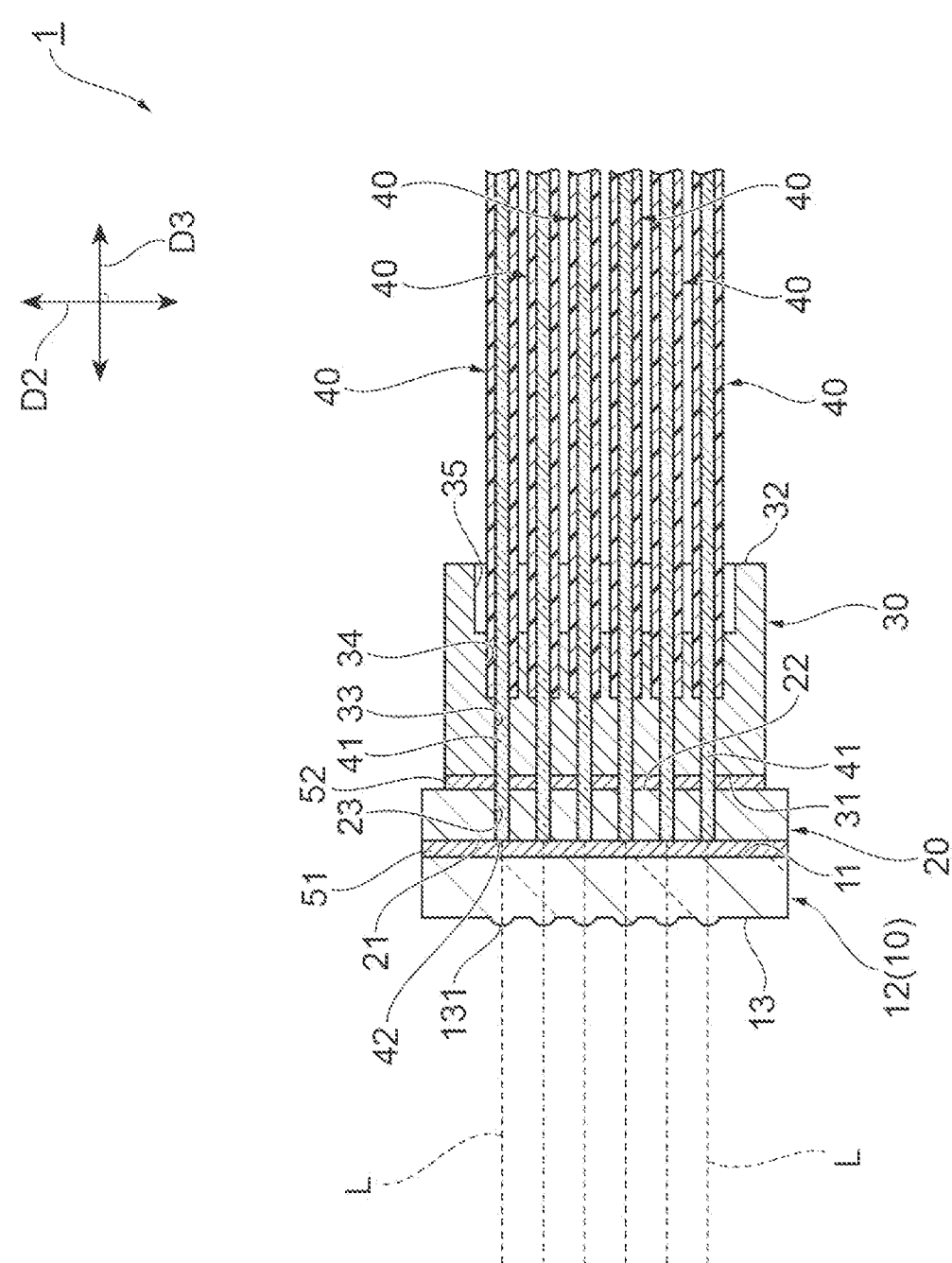
FIG. 3 is a cross-sectional view illustrating the configuration in a case where an optical functional component includes only a lens array.
Figure 4:
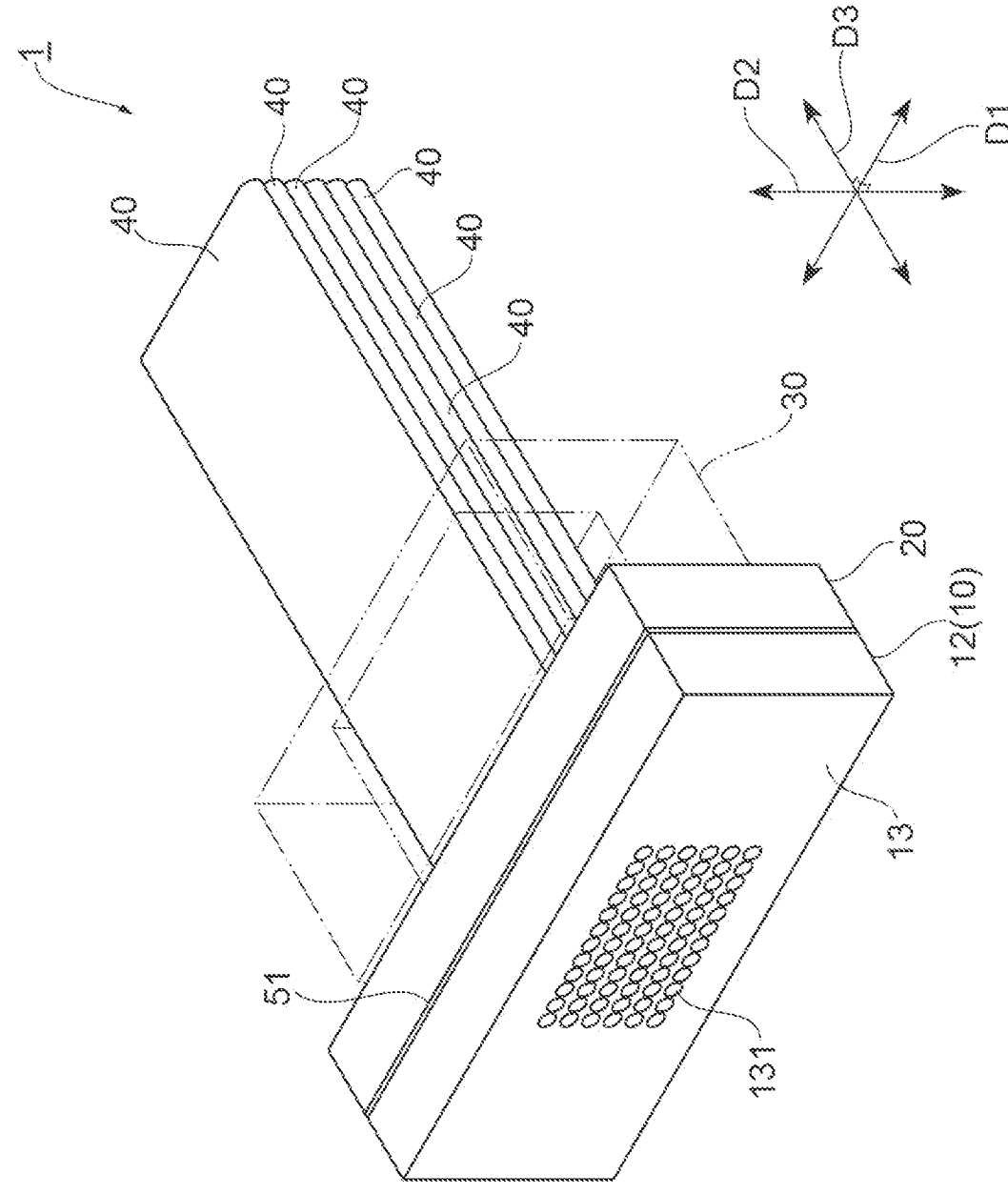
FIG. 4 is a perspective view of the optical connection structure illustrated in FIG. 3.

FIG. 3 is a cross-sectional view illustrating the configuration in a case where the optical functional component 10 includes only a lens array 12. FIG. 4 is a perspective view of the optical connection structure 1 illustrated in FIG. 3. In FIG. 4, the distortion suppression member 30 is indicated by an imaginary line. The lens array 12 has the surface 11 described above and a surface 13 facing away from the surface 11. The lens array 12 has a flat plate shape or a rectangular parallelepiped shape. The surface 13 extends along the direction D1 and the direction D2 and intersects the direction D3. In one example, the surface 13 is parallel to the surface 11. The thickness of the lens array 12 in the direction D3, that is, the distance between the surface 11 and the surface 13 is in the range of, for example, 0.5 mm to 3.0 mm.

M×N lenses 131 respectively corresponding to the M×N optical fibers 41 are formed on the surface 13. Each lens 131 is a convex lens protruding from the surface 13 and is optically coupled to the corresponding optical fiber 41. In other words, the M×N lenses 131 are two-dimensionally arranged over M rows and N columns with the direction D1 being the row direction and the direction D2 being the column direction. In one example, the lens array 12 is mainly made of, for example, silicon (Si). In one example, the lens array 12 is made of silicon. The thermal expansion coefficient of the silicon is $3 \times 10^{-6} \mathrm{K}^{-1}$, and the Young's modulus of the silicon is 131000 MPa.

In the optical connection structure 1 illustrated in FIGS. 3 and 4, the light L emitted from the end face 42 of each optical fiber 41 enters the lens array 12. The light L is emitted from the surface 13 while being parallelized (collimated) by each lens 131 of the lens array 12. Alternatively, the light L that is parallel light incident on the surface 13 of the lens array 12 is incident on the end face 42 of each optical fiber 41 while being condensed by each lens 131.

Figure 5:
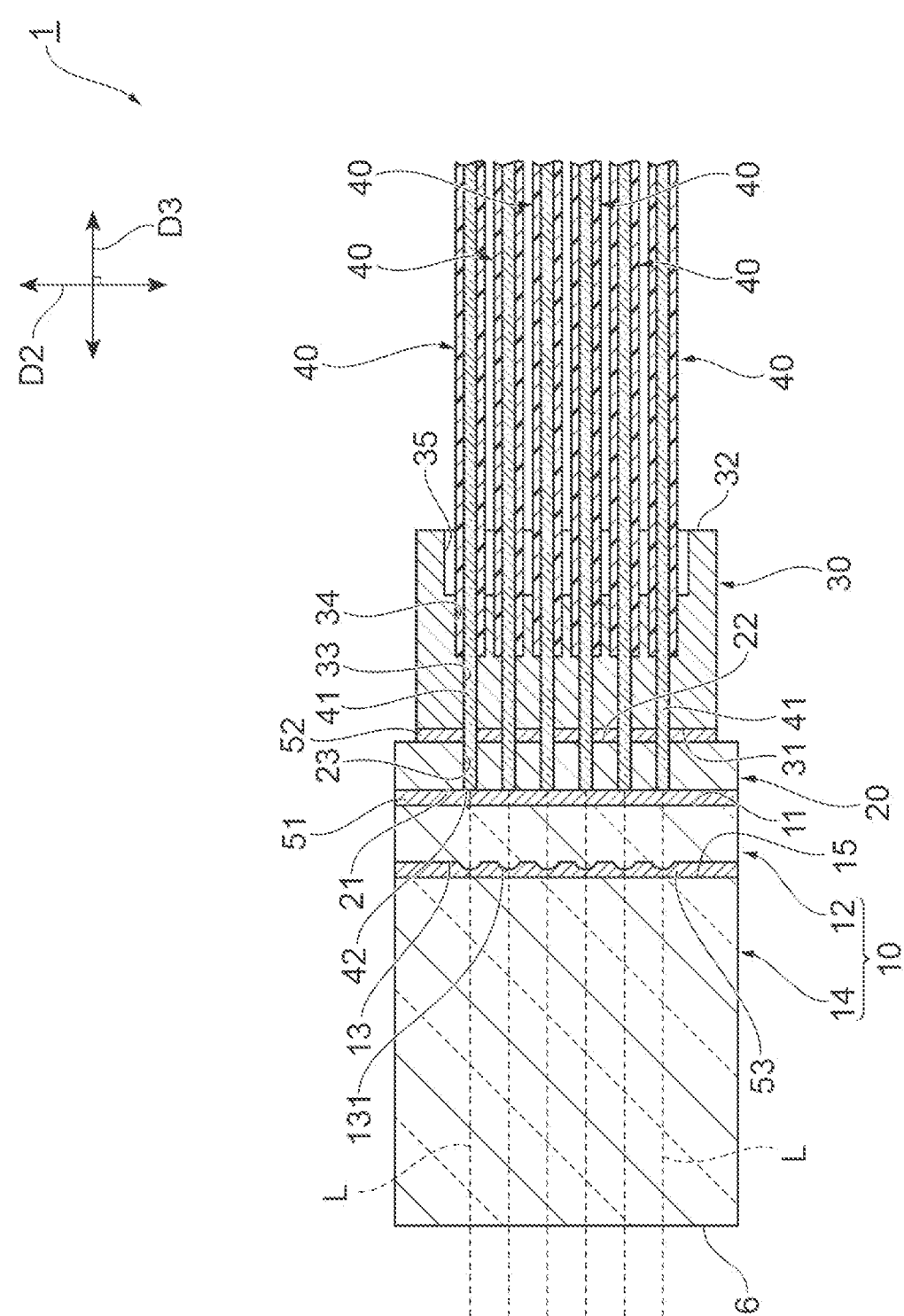
FIG. 5 is a cross-sectional view illustrating the configuration of the optical connection structure 1 in a case where the optical functional component includes the lens array and an optical element.

FIG. 5 is a cross-sectional view illustrating the configuration of the optical connection structure 1 in a case where the optical functional component 10 includes the lens array 12 and an optical element 14. The lens array 12 is sandwiched between the holding member 20 and the optical element 14 in the direction D3. The optical element 14 is directly or indirectly fixed to the lens array 12. Specifically, the optical element 14 has a surface 15 facing the surface 13 of the lens array 12 and a surface 16 facing away from the surface 15. The surface 15 extends along the direction D1 and the direction D2 and intersects the direction D3. In one example, the surface 15 is flat. The normal direction of the surface 15 may coincide with the direction D3 or may be slightly inclined with respect to the direction D3. The thickness of the optical element 14 in the direction D3, that is, the distance between the surface 15 and the surface 16, is, for example, in the range of 0.5 mm to 10 mm. The optical element 14 is, for example, at least one of a rotator, an optical filter, an optical isolator, or an optical path conversion component.

The surface 15 faces the surface 13 of the lens array 12 and is directly or indirectly fixed to the surface 13. In one example, the surface 15 is bonded to the surface 13 with an adhesive 53. In other words, the adhesive 53 is interposed between the surface 15 and the surface 13. The adhesive 53 is light-transmissive. The adhesive 53 is, for example, a resin adhesive. An adhesive that has a refractive index difference of zero or close to zero with respect to the constituent material of the optical element 14 is selected as the adhesive 53. Examples of the adhesive 53 include epoxy resin-based, acrylic resin-based, and silicone resin-based adhesives. The thickness of the adhesive 53 in the direction D3 is, for example, in the range of 0.01 mm to 0.1 mm.

In the optical connection structure 1 illustrated in FIG. 5, the light L emitted from the end face 42 of each optical fiber 41 enters the lens array 12. The light L is emitted from the surface 13 while being parallelized (collimated) by each lens 131 of the lens array 12. After that, the light L enters the optical element 14, receives a predetermined action in the optical element 14, and then is emitted from the surface 16. Alternatively, the light L that is parallel light incident on the surface 16 of the optical element 14 is incident on the end face 42 of each optical fiber 41 while being condensed by each lens 131 of the lens array 12 after receiving a predetermined action in the optical element 14.

Figure 6:
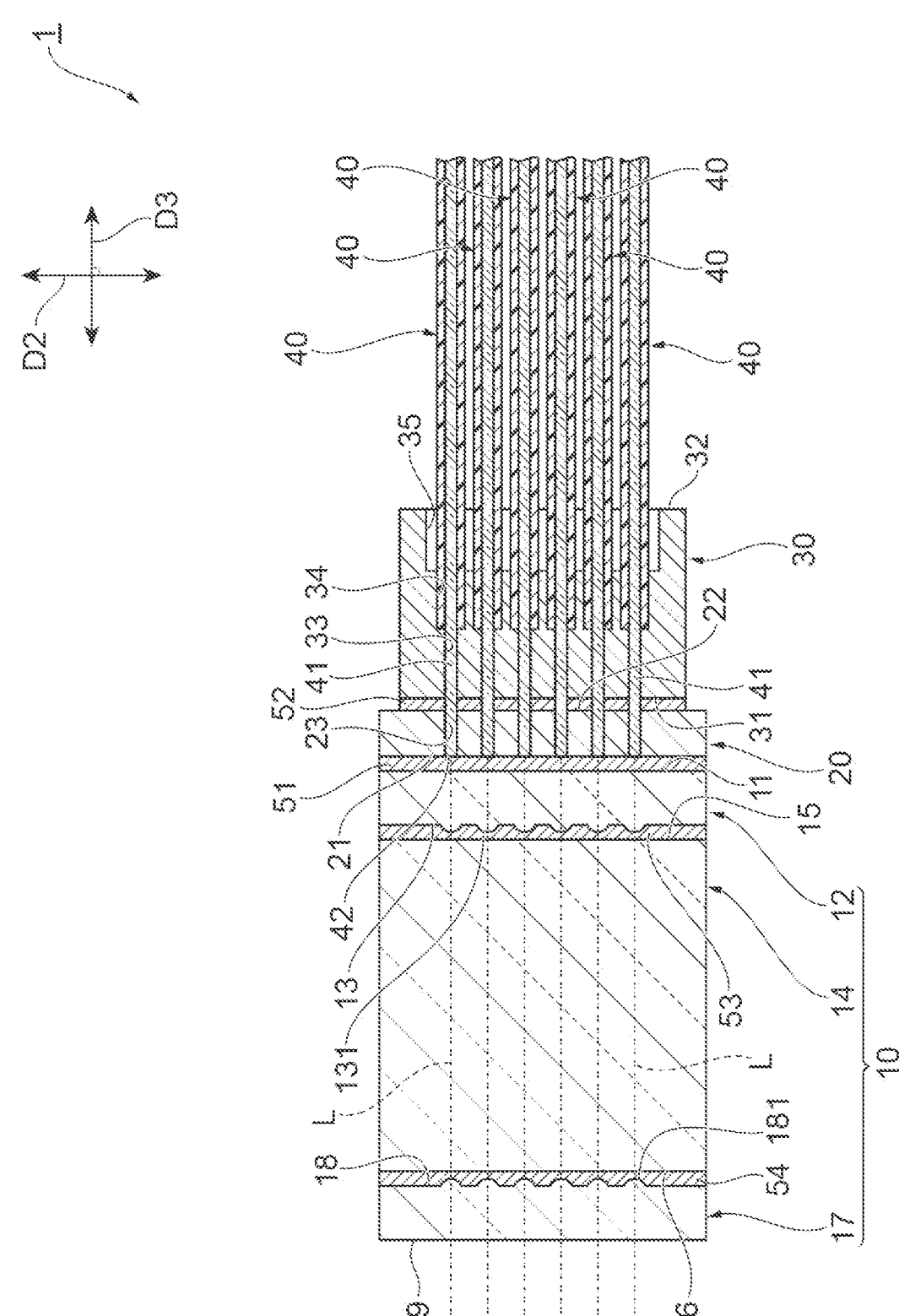
FIG. 6 is a cross-sectional view illustrating the configuration of the optical connection structure in a case where the optical functional component includes the lens array, the optical element, and a lens array.

FIG. 6 is a cross-sectional view illustrating the configuration of the optical connection structure 1 in a case where the optical functional component 10 includes the lens array 12, the optical element 14, and a lens array 17. The lens array 17 has a surface 18 and a surface 19 facing away from the surface 18. The lens array 17 has a flat plate shape or a rectangular parallelepiped shape. The surfaces 18 and 19 extend along the direction D1 and the direction D2 and intersect the direction D3. In one example, the surface 19 is parallel to the surface 18. The thickness of the lens array 17 in the direction D3, that is, the distance between the surface 18 and the surface 19, is, for example, in the range of 0.5 mm to 3.0 mm.

The surface 18 faces the surface 16 of the optical element 14 and is directly or indirectly fixed to the surface 16. In one example, the surface 18 is bonded to the surface 16 with an adhesive 54. In other words, the adhesive 54 is interposed between the surface 18 and the surface 16. The same adhesive as the adhesive 53 described above can be used as the adhesive 54.

M×N lenses 181 respectively corresponding to the M×N optical fibers 41 are formed on the surface 18. Each lens 181 is a convex lens protruding from the surface 18 and is optically coupled to the corresponding optical fiber 41 via the lens 131. In other words, the M×N lenses 181 are two-dimensionally arranged over M rows and N columns with the direction D1 being the row direction and the direction D2 being the column direction. In one example, the lens array 17 is mainly made of, for example, silicon (Si). In one example, the lens array 17 is made of silicon.

In the optical connection structure 1 illustrated in FIG. 6, the light L emitted from the end face 42 of each optical fiber 41 enters the lens array 12. The light L is emitted from the surface 13 while being parallelized (collimated) by each lens 131 of the lens array 12. After that, the light L enters the optical element 14, receives a predetermined action in the optical element 14, and then is emitted from the surface 19 while being condensed by each lens 181 of the lens array 17. Alternatively, the light L that is divergent light incident on the surface 19 of the lens array 17 is parallelized (collimated) by each lens 181 of the lens array 17, receives a predetermined action in the optical element 14, and then is incident on the end face 42 of each optical fiber 41 while being condensed by each lens 131 of the lens array 12.

Figure 7:
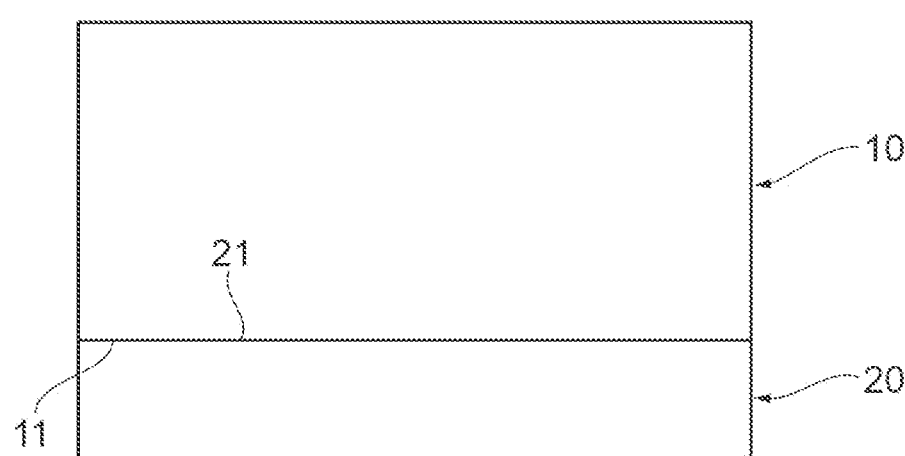
FIG. 7 is a schematic diagram illustrating the optical functional component and a holding member in a case where a distortion suppression member is not provided as a comparative example.
Figure 8:
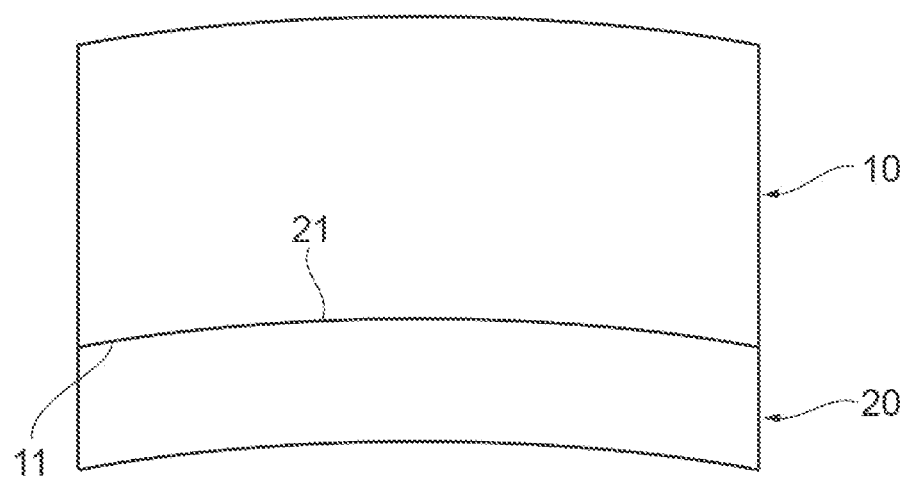
FIG. 8 is a diagram illustrating how the holding member is distorted in the comparative example.

Effects of the optical connection structure 1 of the present embodiment configured as described above will be described. FIG. 7 is a schematic diagram illustrating the optical functional component 10 and the holding member 20 in a case where the distortion suppression member 30 is not provided as a comparative example. When the optical functional component 10 and the holding member 20 are fixed to each other in this manner, the surface 21 of the holding member 20 is distorted as illustrated in FIG. 8 due to the difference in thermal expansion coefficient between the optical functional component 10 and the holding member 20. As a result, the direction of the optical axis of each optical fiber 41 fluctuates, and the efficiency of optical coupling between each optical fiber 41 and the optical functional component 10, the lens array 12 in particular, declines.

Figure 9:
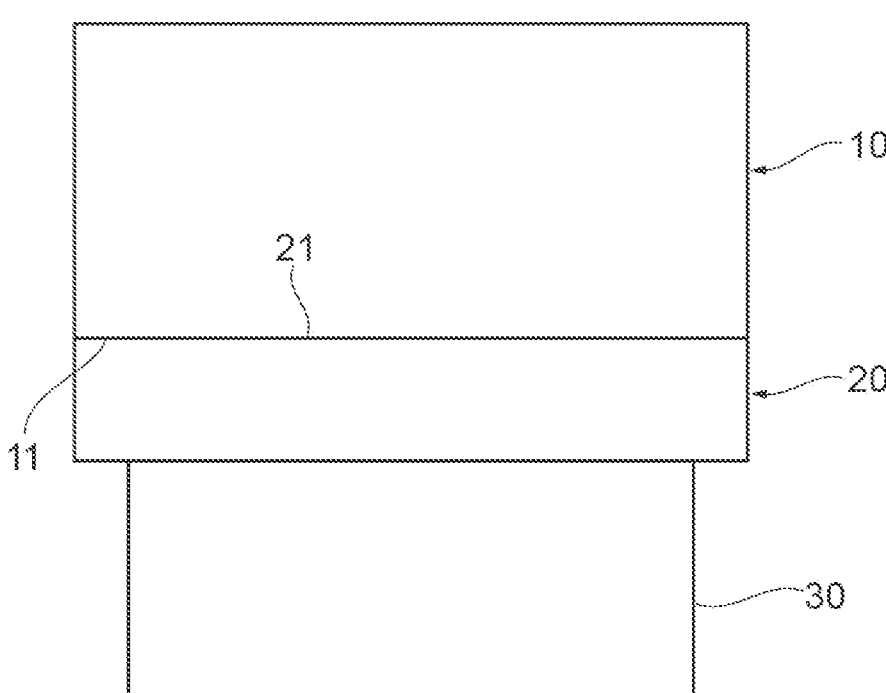
FIG. 9 is a schematic diagram illustrating the optical functional component, the holding member, and the distortion suppression member of one embodiment.

FIG. 9 is a schematic diagram illustrating the optical functional component 10, the holding member 20, and the distortion suppression member 30 of the present embodiment. In order to address the above problem, the holding member 20 is sandwiched between the optical functional component 10 and the distortion suppression member 30 in the optical connection structure 1 of the present embodiment. Further, the optical functional component 10 and the distortion suppression member 30 are higher or lower in thermal expansion coefficient than the holding member 20. In the holding member 20 in this case, stress in the opposite direction as described above attributable to the distortion suppression member 30 is generated in addition to the above stress attributable to the optical functional component 10 due to a change in temperature. As a result, the distortion on the surface 21 of the holding member 20 is reduced. Therefore, according to the optical connection structure 1 of the present embodiment, fluctuations in the direction of the optical axis of each optical fiber 41 attributable to a change in temperature can be reduced, and the degree of decline in the efficiency of optical coupling between each optical fiber 41 and the optical functional component 10, the lens array 12 in particular, can be reduced.

The thickness of the distortion suppression member 30 in the direction D3 may be 1 mm or more as in the present embodiment. As illustrated in the example to be described later, according to the present inventor's simulation, in a case where the thickness of the distortion suppression member 30 is less than 1 mm, bending of the holding member 20 is increasingly suppressed as the thickness of the distortion suppression member 30 increases regardless of the Young's modulus of the distortion suppression member 30. On the other hand, in a case where the thickness of the distortion suppression member 30 is 1 mm or more, the correlation between the thickness of the distortion suppression member 30 and bending of the holding member 20 is low regardless of the Young's modulus of the distortion suppression member 30. Therefore, the above effects can be sufficiently exhibited insofar as the distortion suppression member 30 has a thickness of at least 1 mm.

The distortion suppression member 30 may hold the plurality of optical fibers 41 as in the present embodiment. In this case, the plurality of optical fibers 41 can be held more firmly by the distortion suppression member 30 and the holding member 20 cooperating with each other.

The optical functional component 10 may include the lens array 12 and the lens array 12 may include the surface 11 as in the present embodiment. In this case, the plurality of optical fibers 41 and the lens array 12 are optically coupled, and it is possible to provide the optical connection structure 1 in which a decline in the efficiency of optical coupling between each optical fiber 41 and the lens array 12 attributable to a change in temperature is small.

The main constituent material of the lens array 12 may be silicon (Si), the main constituent material of the holding member 20 may be glass, and the main constituent material of the distortion suppression member 30 may be resin as in the present embodiment. In this case, both the thermal expansion coefficient of the lens array 12 and the thermal expansion coefficient of the distortion suppression member 30 are higher than the thermal expansion coefficient of the holding member 20. Therefore, the above effects can be exhibited.

The optical functional component 10 may further include the optical element 14 different from the lens array 12 as in the present embodiment. The lens array 12 may be sandwiched between the holding member 20 and the optical element 14 in the direction D3, and the optical element 14 may be directly or indirectly fixed to the lens array 12. In this case, it is possible to provide the optical connection structure 1 that performs various operations with respect to the light L that enters each optical fiber 41 or the light L that is emitted from each optical fiber 41.

The optical connection structure 1 may include the optical fiber ribbon 40 formed by the resin coating collectively protecting the plurality of optical fibers 41 as in the present embodiment. The distortion suppression member 30 may have the plurality of fiber holding holes 33 respectively accommodating the plurality of optical fibers 41 and the ribbon holding hole 34 accommodating the optical fiber ribbon 40. In this case, the plurality of optical fibers 41 can be held more firmly via the optical fiber ribbon 40.

The distortion suppression member 30 may further have the surface 32 facing away from the surface 31 in the direction D3 as in the present embodiment. The ribbon holding hole 34 may extend toward the surface 31 along the direction D3 from the bottom surface of the recessed portion 35 formed in the surface 32. The plurality of fiber holding holes 33 may extend along the direction D3 from the ribbon holding hole 34 and reach the surface 31. In this case, the optical fiber ribbon 40 and the plurality of optical fibers 41 can be held with an easy-to-form simple structure.

The surface 21 may be bonded to the surface 11 with the adhesive 51 as in the present embodiment. In this case, the surface 21 can be indirectly fixed to the surface 11.

The surface 31 may be bonded to the surface 22 with the adhesive 52 as in the present embodiment. In this case, the surface 31 can be indirectly fixed to the surface 22.

Example

Here, a simulation of the optical connection structure 1 according to the above embodiment and the result of the simulation will be described.

Figure 10:
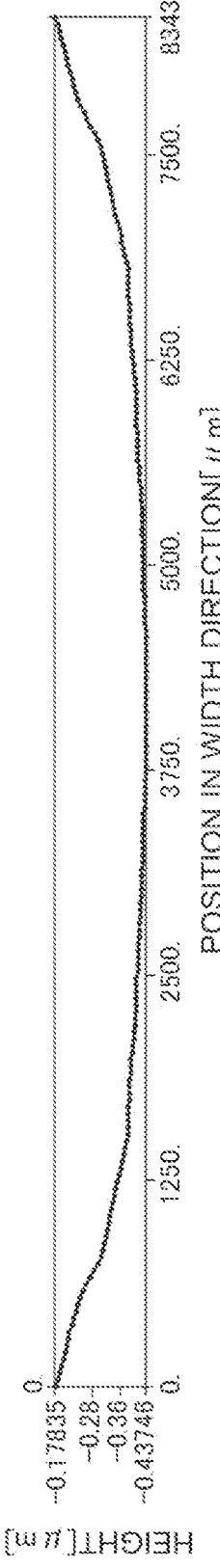
FIG. 10 is a graph illustrating the result of simulating the degree of distortion of the holding member with the ambient temperature of the optical connection structure in FIG. 5 raised from 25° C. to 110° C.
Figure 11:
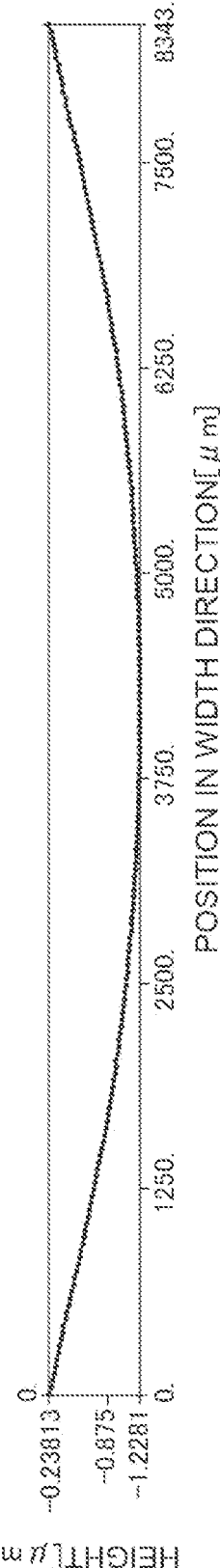
FIG. 11 is a graph illustrating, as a comparative example, the result of simulation in a case where the distortion suppression member is not provided in the optical connection structure illustrated in FIG. 5.

FIG. 10 is a graph illustrating the result of simulating the degree of distortion of the surface 21 of the holding member 20 with the ambient temperature of the optical connection structure 1 in FIG. 5 raised from 25° C. to 110° C. FIG. 11 illustrates, as a comparative example, the result in a case where the distortion suppression member 30 is not provided in the optical connection structure 1 illustrated in FIG. 5. In these drawings, the vertical axis represents the height of the surface 21, that is, the position (unit: μm) of each part of the surface 21 in the direction D3, and the horizontal axis indicates the position in the width direction, that is, the position (unit: μm) of each part of the surface 21 in the direction D1. In this simulation, the optical element 14 was a rotator and the thickness of the rotator in the direction D3 was 6 mm. The materials of the rotator are yttrium, iron, and garnet. The thickness of the holding member 20 in the direction D3 was 1 mm, and the thickness of the distortion suppression member 30 in the direction D3 was 3 mm. The material of the holding member 20 is borosilicate glass. The material of the distortion suppression member 30 is liquid crystal polymer (LCP).

As illustrated in FIG. 11, in a case where the distortion suppression member 30 was not provided, the amount of warpage, that is, the maximum amount of distortion of the surface 21 of the holding member 20 was 0.99 μm. On the other hand, as illustrated in FIG. 10, in a case where the distortion suppression member 30 was provided, the amount of warpage, that is, the maximum amount of distortion of the surface 21 was 0.26 μm. In this manner, according to the optical connection structure 1 of the embodiment described above, bending of the surface 21 of the holding member 20 can be reduced by providing the distortion suppression member 30.

Figure 12:
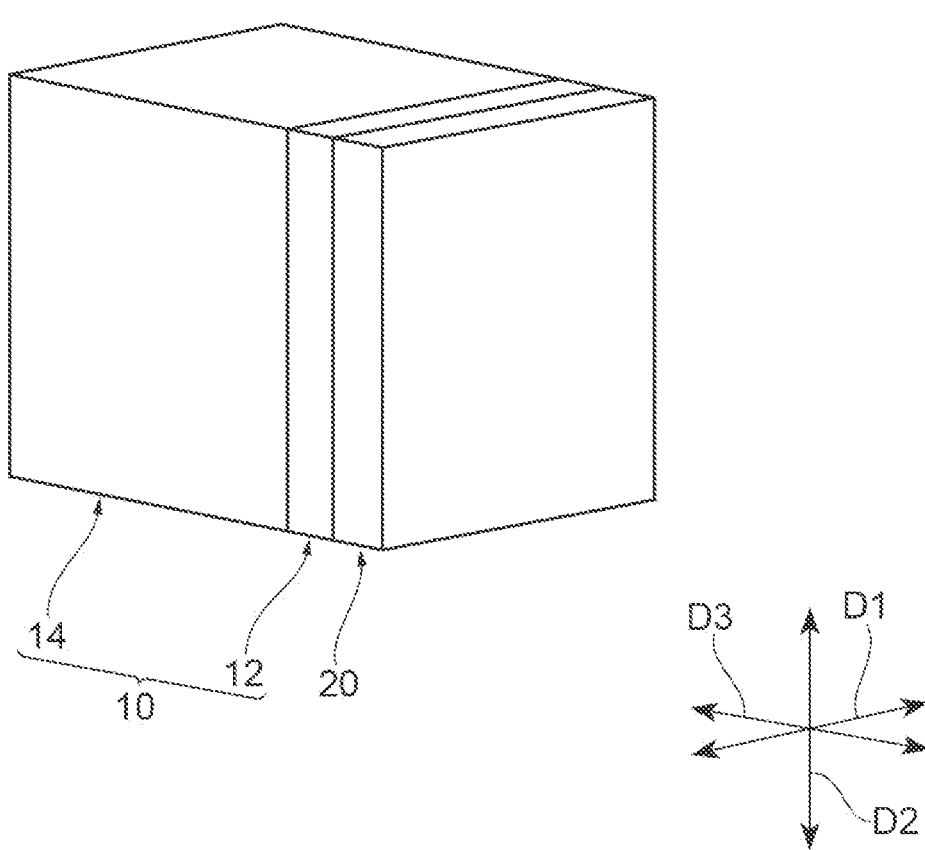
FIG. 12 is a perspective view illustrating a model used in another simulation, which illustrates a model in a case where the distortion suppression member is not provided.
Figure 13:
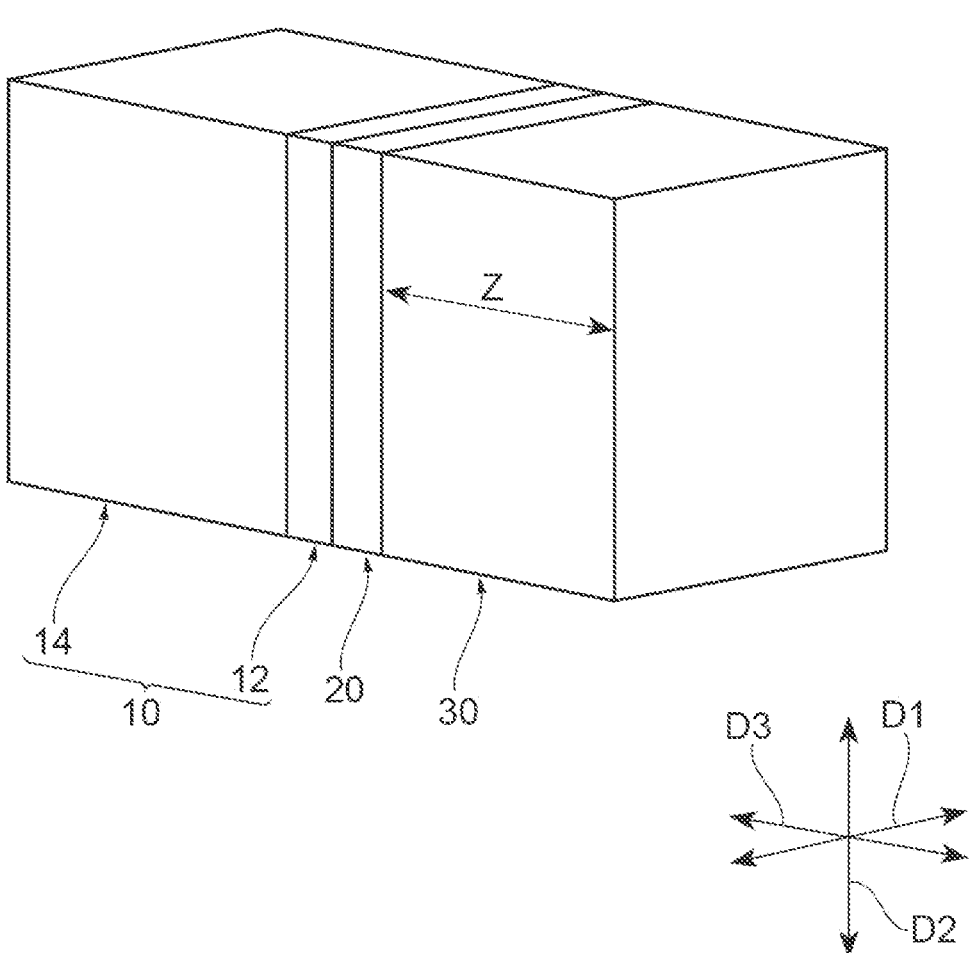
FIG. 13 is a perspective view illustrating a model used in another simulation, which illustrates a model in a case where the distortion suppression member is provided.

FIGS. 12 and 13 are perspective views illustrating models used in another simulation. FIG. 12 illustrates a model in a case where the distortion suppression member 30 is not provided, and FIG. 13 illustrates a model in a case where the distortion suppression member 30 is provided. In this simulation, each cross section of the lens array 12, the optical element 14 (rotator), the holding member 20, and the distortion suppression member 30 of the optical connection structure 1 in FIG. 5 that is perpendicular to the direction D3 was a 6 mm×6 mm square. Further, thicknesses Z of the lens array 12, the optical element 14 (rotator), and the holding member 20 in the direction D3 were 1 mm, 6 mm, and 1 mm, respectively. The thickness of the distortion suppression member 30 in the direction D3 was varied in the range of 0.0 mm to 5.0 mm Each of the adhesives 51, 52, and 53 had a thickness of 30 μm. FIG. 14 illustrates the Young's modulus, thermal expansion coefficient, and Poisson's ratio of each of the optical element 14 (rotator), lens array 12, holding member 20, distortion suppression member 30, and adhesives 51, 52, and 53 of the model used in this simulation.

Figure 15:
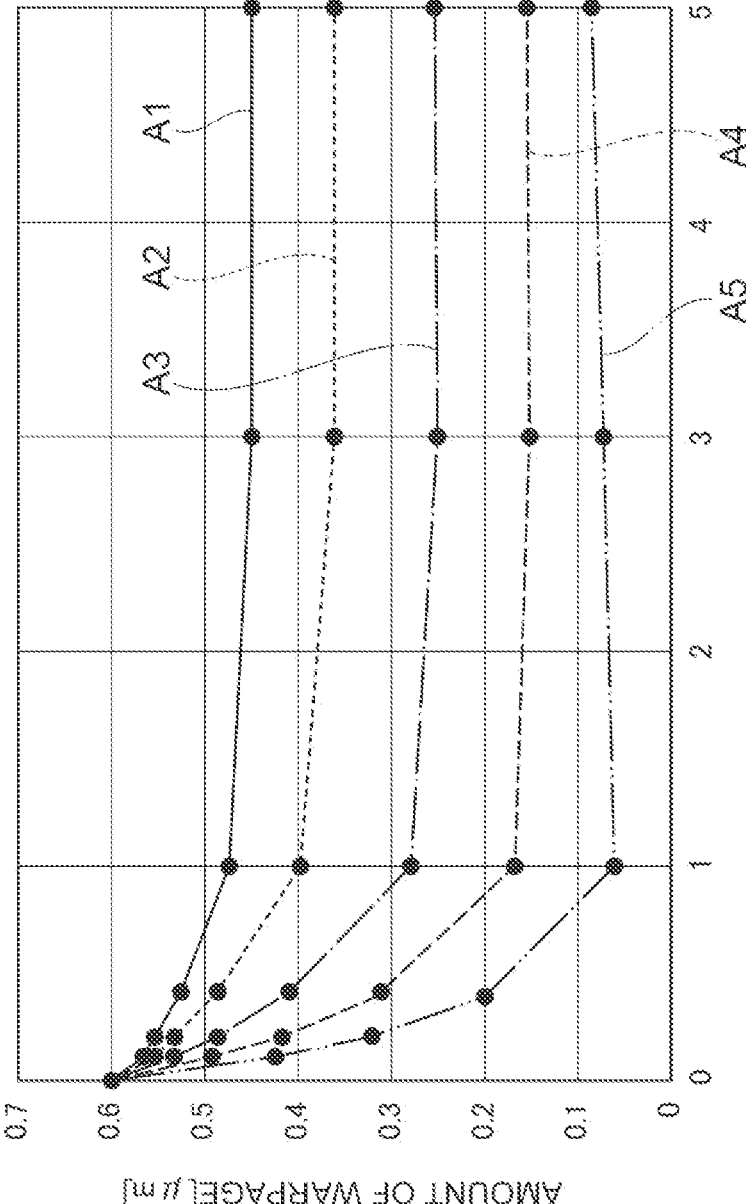
FIG. 15 is a graph illustrating the relationship between the thickness of the distortion suppression member and the amount of warpage (maximum amount of distortion) as the result of the simulation.

FIG. 15 is a graph illustrating the relationship between the thickness of the distortion suppression member 30 and the amount of warpage, that is, the maximum amount of distortion of the surface 21 as the result of this simulation. The horizontal axis represents the thickness (unit mm) of the distortion suppression member 30, and the vertical axis represents the amount of warpage, that is, the maximum amount of distortion (unit: μm). Lines A1 to A5 in the drawing indicate cases where the Young's modulus of the distortion suppression member 30 is 5000 MPa, 10000 MPa, 20500 MPa, 40000 MPa, and 80000 MPa, respectively. Referring to the drawing, it can be seen that warpage of the surface 21 is reduced in a case where the distortion suppression member 30 is present as compared with a case where the distortion suppression member 30 is absent (0 mm in thickness). In addition, it can be seen that warpage of the surface 21 decreases as the Young's modulus of the distortion suppression member 30 increases.

In addition, referring to FIG. 15, warpage of the surface 21 is increasingly suppressed as the thickness of the distortion suppression member 30 increases in a case where the thickness of the distortion suppression member 30 is less than 1 mm. On the other hand, in a case where the thickness of the distortion suppression member 30 is 1 mm or more, the correlation between the thickness of the distortion suppression member 30 and the amount of warpage of the surface 21 is low. Therefore, it can be seen that the effects of the embodiment described above can be sufficiently exhibited insofar as the distortion suppression member 30 has a thickness of at least 1 mm.

Figure 16:
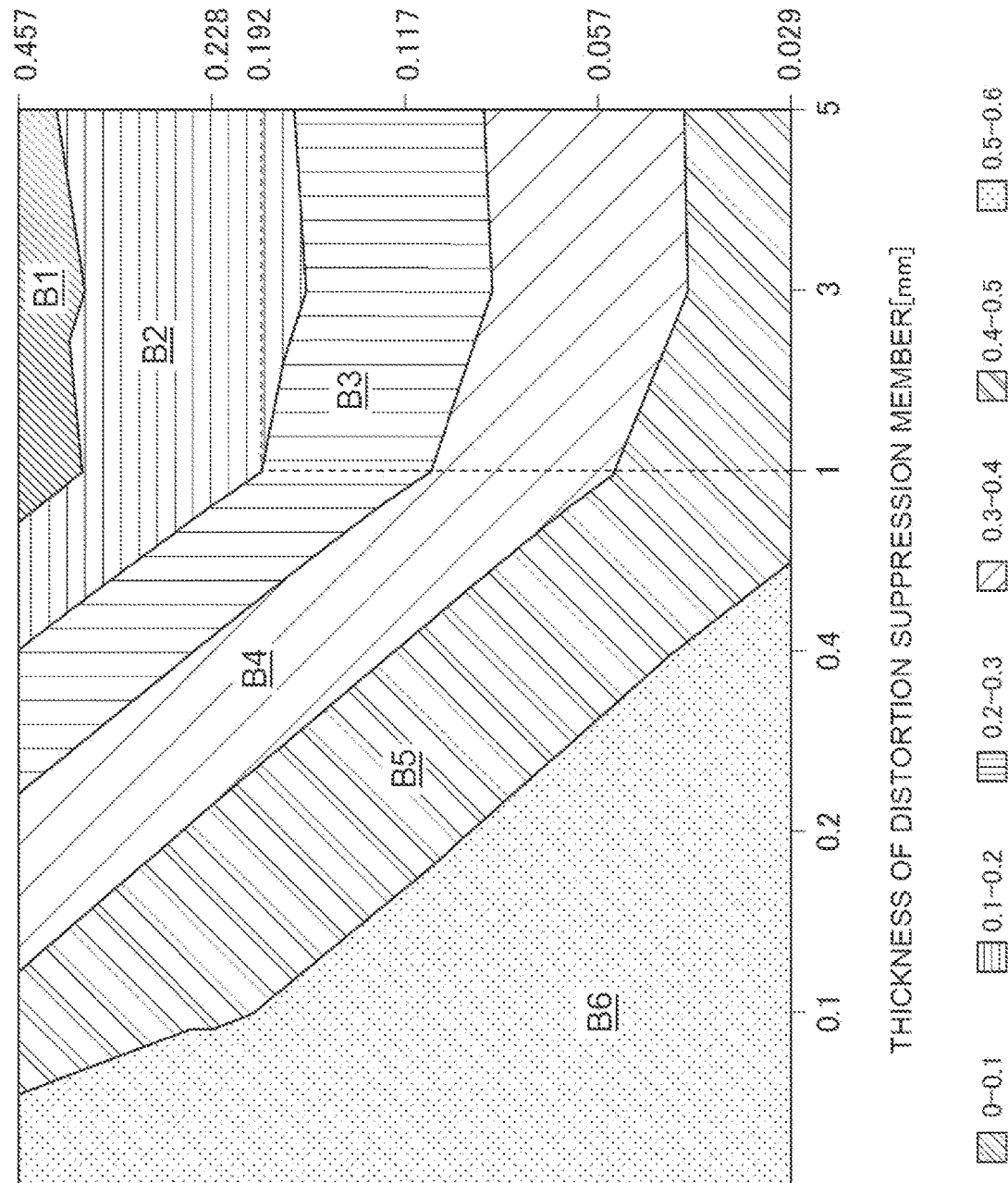
FIG. 16 is a graph illustrating the relationship between the thickness of the distortion suppression member, the amount of warpage, and an effective Young's modulus calculated from the Young's modulus of the optical element (rotator) and the Young's modulus of the distortion suppression member based on the simulation result illustrated in FIG. 15.

FIG. 16 is a graph illustrating the relationship between the thickness of the distortion suppression member 30, the amount of warpage of the surface 21, and an effective Young's modulus Ec calculated from a Young's modulus Ea of the optical element 14 (rotator) and a Young's modulus Eb of the distortion suppression member 30 based on the simulation result illustrated in FIG. 15. In the drawing, the horizontal axis indicates the thickness (unit mm) of the distortion suppression member 30, the vertical axis indicates the ratio (Eb/Ec), and a plurality of regions divided depending on the amount of warpage of the surface 21 are illustrated. Regions B1 to B6 in the drawing indicate regions where the amount of warpage of the surface 21 is 0.0 μm to 0.1 μm, 0.1 μm to 0.2 μm, 0.2 μm to 0.3 μm, 0.3 μm to 0.4 μm, 0.4 μm to 0.5 μm, and 0.5 μm to 0.6 μm, respectively.

Referring to FIG. 16, it can be seen that the amount of warpage of the surface 21 is in the range of 0.0 to 0.2 and the amount of warpage of the surface 21 can be effectively reduced insofar as the ratio (Eb/Ec) is 0.192 or more with the thickness of the distortion suppression member 30 in the range of 1 mm or more. The vertical axis in FIG. 16 can be calculated from the law of composition of composite materials using the Young's modulus Ea of the optical element 14 (rotator) and the Young's modulus Eb of the distortion suppression member 30.

The optical connection structure according to the present disclosure is not limited to the embodiment described above, and various modifications are possible. For example, in the embodiment described above, the optical functional component 10 and the holding member 20 are fixed via the adhesive 51 only. Without being limited to this form, a separate member may be sandwiched between the optical functional component 10 and the holding member 20 and the optical functional component 10 and the holding member 20 may be indirectly fixed via the separate member. Likewise, in the embodiment described above, the holding member 20 and the distortion suppression member 30 are fixed via the adhesive 52 only. Without being limited to this form, a separate member may be sandwiched between the holding member 20 and the distortion suppression member 30 and the holding member 20 and the distortion suppression member 30 may be indirectly fixed via the separate member.

In the embodiment described above, the distortion suppression member 30 has the function of holding the plurality of optical fibers 41. Without being limited to this form, the distortion suppression member may not have the function of holding the plurality of optical fibers 41. For example, the distortion suppression member may have a through hole through which the N optical fiber ribbons 40 and the N×M optical fibers 41 are collectively inserted instead of the fiber holding hole 33 and the ribbon holding hole 34.

In the embodiment described above, the optical functional component 10 is indirectly fixed to the holding member 20 via the adhesive 51. Without being limited to this form, the optical functional component 10 may be directly fixed to the holding member 20. Laser welding or the like can be used as a method for the direct fixing. Likewise, in the embodiment described above, the holding member 20 is indirectly fixed to the distortion suppression member 30 via the adhesive 52. Without being limited to this form, the holding member 20 may be directly fixed to the distortion suppression member 30. Laser welding or the like can be used as a method for the direct fixing.

REFERENCE SIGNS LIST

1: optical connection structure, 10: optical functional component, 11: first surface, 12: lens array, 13, 15, 16, 18, 19, 31, 32: surface, 14: optical element, 17: lens array, 20: holding member, 21: second surface, 22: third surface, 23, 33: fiber holding hole, 30: distortion suppression member, 34: ribbon holding hole, 35: recessed portion, 40: optical fiber ribbon, 41: optical fiber, 42: end face, 51, 52, 53, 54:

adhesive, 131, 181: lens, A1 to A5: line, B1 to B6: region, D1: first direction, D2: direction, D3: second direction, L: light.

The invention claimed is:

1. An optical connection structure comprising:
   a plurality of optical fibers disposed such that end faces are arranged in at least a first direction and respectively extending along a second direction intersecting the first direction;
   an optical functional component having a first surface facing the end faces of the plurality of optical fibers and optically coupled to the end faces of the plurality of optical fibers on the first surface;
   a holding member having a second surface facing the first surface and directly or indirectly fixed to the first surface, a third surface facing away from the second surface, and a plurality of fiber holding holes extending from the third surface toward the second surface and respectively accommodating the plurality of optical fibers; and
   a distortion suppression member having a fourth surface facing the third surface and directly or indirectly fixed to the third surface and sandwiching the holding member with the optical functional component in the second direction,
   wherein thermal expansion coefficients of the optical functional component and the distortion suppression member are higher than a thermal expansion coefficient of the holding member or the thermal expansion coefficients of the optical functional component and the distortion suppression member are lower than the thermal expansion coefficient of the holding member, and
   wherein the third surface is a rear-most surface of the holding member in the second direction, the fourth surface is a front-most surface of the distortion suppression member in the second direction, and the entire fourth surface is disposed to face the third surface.

2. The optical connection structure according to claim 1, wherein a thickness of the distortion suppression member in the second direction is 1 mm or more.

3. The optical connection structure according to claim 2, wherein a ratio (Eb/Ec) of a Young's modulus Eb of the distortion suppression member to an effective Young's modulus Ec of the optical functional component is 0.192 or more.

4. The optical connection structure according to claim 1, wherein the distortion suppression member holds the plurality of optical fibers.

5. The optical connection structure according to claim 4, comprising an optical fiber ribbon formed by a resin coating collectively protecting the plurality of optical fibers,
   wherein the distortion suppression member has a plurality of fiber holding holes respectively accommodating the plurality of optical fibers and a ribbon holding hole accommodating the optical fiber ribbon.

6. The optical connection structure according to claim 5, wherein
   the distortion suppression member further has a fifth surface facing away from the fourth surface in the second direction,
   the ribbon holding hole extends toward the fourth surface along the second direction from a bottom surface of a recessed portion formed in the fifth surface, and
   the plurality of fiber holding holes extend along the second direction from the ribbon holding hole and reach the fourth surface.

7. The optical connection structure according to claim 1, wherein the optical functional component includes a lens array and the lens array includes the first surface.

8. The optical connection structure according to claim 7, wherein a main constituent material of the lens array is silicon, a main constituent material of the holding member is glass, and a main constituent material of the distortion suppression member is resin.

9. The optical connection structure according to claim 7, wherein the optical functional component further includes an optical element different from the lens array, and the lens array is sandwiched between the holding member and the optical element in the second direction, and the optical element is directly or indirectly fixed to the lens array.

10. The optical connection structure according to claim 9, wherein the optical element is at least one of a rotator, an optical filter, an optical isolator, or an optical path conversion component.

11. The optical connection structure according to claim 1, wherein the second surface is bonded to the first surface with an adhesive.

12. The optical connection structure according to claim 1, wherein the fourth surface is bonded to the third surface with an adhesive.

13. The optical connection structure according to claim 1, wherein a thickness of a thickest part of the holding member in the second direction is smaller than a thickness of a thickest part of the distortion suppression member in the second direction.

* * * * *